HIGHLY DISCRIMINATING RADIO FREQUENCY RECEIVER
Filed Nov. 8, 1954
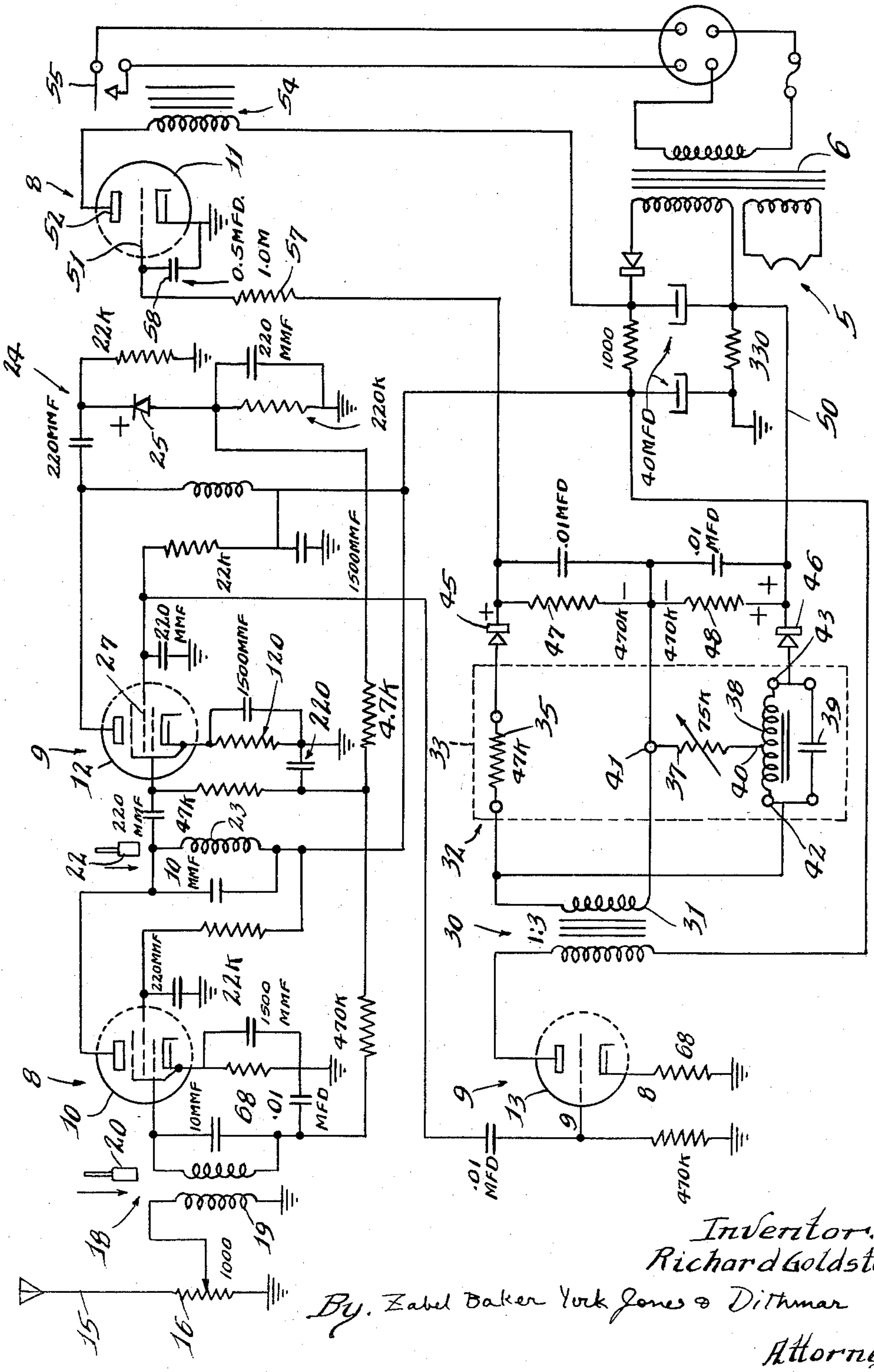
Inventor.
Richard Goldstein
By. Zabel Baker York Jones & Dithmar
Attorneys.

United States Patent Office 2,869,123
Patented Jan. 13, 1959

2,869,123

HIGHLY DISCRIMINATING RADIO FREQUENCY RECEIVER

Richard Goldstein, Des Plaines, Ill., assignor to Perma-Power Company, Chicago, Ill., a corporation of Illinois Application November 8, 1954, Serial No. 467,313

5 Claims. (Cl. 343—225)

This invention relates to a highly discriminating radio frequency receiver, and more particularly to a receiver which comprises the receiver component of a remote control apparatus.

Remote control apparatus embodying subject receiver may have many uses. As one typical example, such apparatus may operate a motor which is connected mechanically to a garage door. Subject receiver is installed in a garage and it receives a signal transmitted by a transmitter component installed in an automobile. The receiver actuates a switch or other control device which in turn stops and starts the motor in response to signals received from the transmitter.

A transmitter component designed to cooperate with subject receiver forms the subject matter of my copending application entitled "Radio Frequency Transmitter," Serial No. 467,314, filed November 8, 1954.

One object of the invention is to provide a radio frequency receiver for remote control apparatus which has a highly discriminating characteristic and thus is not responsive to signals other than a predetermined signal.

Another object is to provide a radio frequency receiver designed to accommodate one of several plug-in channel selectors so that the same receiver is usable at different predetermined signal frequencies, the effective frequency being determined by the particular plug-in channel selector used in the receiver.

Another object is to provide a receiver which in the discriminating portion thereof utilizes a bridged-T network which sharply rejects the signal of predetermined frequency. This network constitutes one of two channels of a tone or signal decoding circuit, the other channel being one which passes all frequencies with little or no attenuation. The outputs of the two channels are rectified and combined in series in such manner that the net output when there is no attenuation in either channel is substantially zero. The bridged-T network channel provides a substantially zero output at the predetermined signal frequency, and, therefore, at signal frequency the combined output of the two channel tone decoding circuit is a substantial voltage which actuates a relay or other control device to energize a motor or the like with which the remote control apparatus is used.

Another object is to provide a radio frequency receiver for use in remote control apparatus which is particularly insensitive to interference frequencies and which operates as intended over a wide range of amplitude of the predetermined signal frequency.

Still another object is to provide a radio frequency receiver of this character which may utilize only two vacuum tubes, the tubes preferably being of the same type.

Still another object is to provide a radio frequency receiver which is comparatively simple and inexpensive and which can be expected to have a long, trouble-free life.

Other objects, advantages and details of the invention will be apparent as the description proceeds, reference being had to the accompanying schematic drawing wherein a circuit embodying the invention is shown. It is to be understood that the description and drawing are illustrative only and that the scope of the invention is to be measured by the appended claims.

Referring now to the single figure of the drawing, the illustrated receiver includes a D. C. power supply 5 (lower right-hand corner) comprising a half-wave rectifier and a single section resistance-capacitance filter. A power transformer 6 is designed for operation from the available A. C. power source.

The illustrated receiver employs two vacuum tubes 8 and 9 of the 6U8 type, each containing a pentode section and a triode section in a single envelope. Thus tube 8 comprises pentode section 10 and triode section 11 while tube 9 comprises pentode section 12 and triode section 13.

A radio frequency carrier of predetermined frequency modulated by a tone or signal of predetermined frequency is received by means of antenna 15, the antenna being connected to a potentiometer 16 which serves as a sensitivity control.

Potentiometer 16 is connected to a tuned input circuit 18 including inductance 19 and tuning slug 20.

Inductance 19 is connected to radio frequency amplifier means comprising two radio frequency amplifier stages which utilize pentode sections 10 and 12 of tubes 8 and 9. The amplifier stage including pentode section 10 is tunable by means of slug 22 and inductance 23 while the stage including pentode section 12 is broadly tuned to resonance at the fixed carrier frequency.

The output of the second radio frequency amplifier stage is applied to a detector stage 24 which includes a suitable detector element 25.

The audio frequency tone or signal derived from detector stage 24 is applied to an audio frequency amplifier means comprising two stages. The first audio frequency amplifier stage comprises a portion of the second radio frequency amplifier stage, screen grid 27 of pentode section 12 being used as the anode of a triode audio frequency amplifier.

The output of the first audio frequency amplifier stage is further amplified in triode section 13 of tube 9, this section operating as a transformer coupled audio frequency amplifier, the transformer being designated 30. Secondary 31 of transformer 30 feeds the amplified audio frequency signal to a decoding circuit generally designated 32.

Decoding circuit 32 includes a plug-in channel selector 33, there being a separate channel selector 33 for each predetermined tone or signal frequency. In remote control apparatus designed to operate a garage door, some ten different channel selectors may be available in order to avoid interference between adjacent installations. Each individual apparatus, transmitter and receiver, may be conditioned to operate on a frequency distinct from adjacent apparatus simply by proper choice of plug-in channel selector 33.

Channel selector 33 includes two channels which each receive the audio frequency signal. One channel has an all-pass frequency characteristic, and, in the form of channel selector shown, this channel is represented by resistance 35. The other channel provides a highly selective band-stop characteristic at the predetermined frequency of the selector.

The band-stop channel is a bridged-T network including variable resistance 37, inductance 38 and capacitance 39 connected in shunt with inductance 38. One terminal or resistance 37 is connected to intermediate point 40 of inductance 38, as shown in the drawing. Thus, the band-stop channel has input terminals 41 and 42 and output terminals 41 and 43, the channel being effective to reject or severely attenuate a signal of the predetermined selector frequency while passing signals of other frequencies without appreciable attenuation.

The outputs of the respective channels are rectified by suitable means such as selenium diodes 45 and 46. The rectified outputs of the two channels are combined in a series circuit including resistances 47 and 48 in such manner that the net output when there is no attenuation in either channel is substantially zero, or even slightly negative. When a tone or signal of the predetermined frequency is applied to decoding circuit 32, the output thereof is a D. C. voltage of substantial amount, and in the form of the invention shown, this voltage is positive. At all other tone or signal frequencies the output of decoding circuit 32 is substantially zero.

The D. C. voltage developed in response to a signal of the predetermined frequency is utilized to actuate a control means which in turn operates a motor or the like.

In the form of the invention shown, the D. C. output of tone or signal decoding circuit 32 is connected in series with a source 50 of bias voltage, the voltage being applied to control grid 51 of triode section 11 of tube 8. Anode 52 of triode section 11 is connected to a suitable load such as a relay 54 which operates a switch 55. The latter, of course, controls the motor or other device with which the remote control apparatus is used.

At all signals other than that of predetermined frequency, the bias voltage derived from source 50 renders triode section 11 non-conducting. Relay 54, of course, is not energized when section 11 is non-conducting. A signal at the predetermined frequency produces a voltage at the output of decoding circuit 32 which cancels or reduces the bias voltage so that triode section 11 becomes conducting. This energizes relay 54 and, for example, closes switch 55 to start the motor or other device.

To insure against unwanted operation as a result of interference signals, such as those of the familiar "squeal" or "whistle" variety, a time delay means may be provided in the circuit leading to grid 51 of triode section 11. In the form of the invention shown, the time delay means comprises resistance 57 and capacitance 58. With the values shown, a time delay of approximately one-half second is provided by this resistance-capacitance network.

In a receiver using circuit elements of the values shown in the drawing, a signal corresponding to the frequency of the plug-in channel selector causes operation of relay 54 while signals of other frequencies have no effect. If the signal level rises to a value equal to twice the threshhold level, the specified frequency will also cause operation of the relay when it is varied approximately plus or minus 3% of the exact channel frequency, but such signal will not operate the relay at deviations greater than about plus or minus 5% from the predetermined frequency even if the level goes up to the maximum that is obtainable through the receiver as limited by AVC action and saturation of the audio frequency amplifiers. Thus, the receiver has an extremely sharp band-pass characteristic resulting from the use of the bridge-T network and the manner in which the network is utilized in the circuit.

Since the useful output of the receiver is the result of the difference between the outputs of separate and independent channels, the differential action thus obtained makes the effective bandwidth of the receiver much more independent of level than if the useful output were determined by the output of the simple resonant circuit working against a fixed reference level. Thus relatively close channel spacing can be provided without elaborate and costly band-pass filters.

The bridge-T network has the distinct advantage that it may be constructed with a relatively low Q inductance, a Q value of 10 providing a satisfactory bandwidth characteristic.

From the above description it is thought that the construction and advantages of the invention will be readily apparent to those skilled in the art. Various changes in detail may be made without departing from the spirit or losing the advantages of the invention.

Having thus described the invention, what I claim as new and desire to secure by Letters Patent is:

1. In combination, a substantially fixed frequency radio receiver including radio-frequency, detector and audio-frequency stages adapted to receive a substantially fixed carrier modulated by a fixed audio-frequency signal, means for impressing the receiver output currents in parallel on two parts of a decoding means, one part of said decoding means forming a substantially pure resistive load including a rectifier and load resistor, the other part of said decoding means consisting of a bridge-T network and a rectifier and load resistor, said two load resistors being connected in series to provide opposed potentials, said bridged-T network being designed to suppress said signal frequency when impressed upon the input thereof, a power supply for providing rectified current to said receiver, said power supply having positive and negative terminals, an electron discharge device having cathode, control electrode and anode for use as a relay tube, a connection from a terminal of the power supply to said anode, a connection from a negative terminal of said power supply through said two load resistors in series to the control electrode, a connection between said cathode and a point on said power supply which is somewhat positive to said negative terminal on said power supply, said decoding means providing substantially no net positive output potential to the control electrode of the relay tube in the absence of signal frequency currents at the input of the bridged-T network, said control electrode of the relay tube being maintained normally negative to the cathode to keep the relay tube cut off, said decoding means providing a net positive potential when signal frequency is applied to the input of the decoding means whereby said relay tube has current passing therethrough from cathode to anode, and a load controlled by the current passing from cathode to anode of said relay tube.

2. The system according to claim 1 wherein said radio receiver includes a pair of pentodes and circuits for operating said two pentodes both as radio-frequency and both as audio-frequency stages, a crystal rectifier for said detector stage, a triode vacuum tube stage between the last audio-frequency pentode stage and the decoding means input and a triode vacuum tube stage functioning as said relay tube, one pentode and one triode being parts of one tube construction and the remaining pentode and remaining triode being parts of a different tube construction whereby the entire receiving device utilizes two similar type tubes to facilitate servicing.

3. The construction according to claim 1 wherein a capacitor is connected across each load resistor in the decoding means.

4. The construction according to claim 1 wherein a time delay circuit is provided in the cathode and control electrode part of said relay tube, said time delay being sufficient to prevent response to a transient.

5. The construction according to claim 1 wherein said bridged-T network comprises an inductor and a capacitor in parallel, one terminal of said inductor constituting one input to said bridged-T network, the associated rectifier being connected between the other terminal of said inductor and one terminal of the associated load resistor, the other terminal of the load resistor for said bridged-T network forming a combined input and output terminal, a variable resistor connected between said combined input and output terminal and a center tap on said inductor, said one part of said decoding means comprising a resistor and rectifier and load resistor all connected in series with each other, the rectifiers for said decoding means being so poled that the common terminal for the two load resistors is negative with respect to the remaining terminal of each load resistor.

(References on following page)

References Cited in the file of this patent

UNITED STATES PATENTS

| | | |
|---|---|---|
| 1,530,537 | Affel | Mar. 24, 1925 |
| 1,759,952 | McCurdy | May 27, 1930 |
| 1,902,031 | Holden | Mar. 21, 1933 |
| 1,956,121 | Craig | Apr. 24, 1934 |
| 2,173,427 | Scott | Sept. 19, 1939 |
| 2,299,330 | Macnabb | Oct. 20, 1942 |
| 2,321,651 | Caraway | June 15, 1943 |
| 2,392,672 | Kock | Jan. 8, 1946 |
| 2,560,320 | Winkler | July 10, 1951 |
| 2,603,748 | Bell | July 15, 1952 |
| 2,604,518 | Oliver | July 22, 1952 |
| 2,654,032 | Staschover | Sept. 29, 1953 |